United States Patent [19]

Keith et al.

[11] Patent Number: 4,829,634

[45] Date of Patent: May 16, 1989

[54] MEAT CUTTING MACHINE

[75] Inventors: Malcolm E. Keith, West Chicago; Michael P. Cayley, South Barrington, both of Ill.

[73] Assignee: Midaco Corporation, Elk Grove Village, Ill.

[21] Appl. No.: 242,149

[22] Filed: Sep. 7, 1988

[51] Int. Cl.[4] .......... A22B 5/00

[52] U.S. Cl. .......... 17/24; 17/44; 17/63; 198/803.14

[58] Field of Search .......... 17/24, 52, 15, 44, 63; 198/803.14, 712, 713; 83/425

[56] References Cited

U.S. PATENT DOCUMENTS

| | | | |
|---|---|---|---|
| 907,790 | 12/1908 | Hancock | 198/803.14 |
| 2,421,547 | 6/1947 | Davidson | 17/24 |
| 2,803,035 | 8/1957 | Bartels et al. | 17/63 |
| 3,461,485 | 8/1969 | Crepeau | 17/63 |
| 4,389,750 | 6/1983 | Kristinsson et al. | 17/63 |
| 4,551,885 | 11/1985 | Molnar | 17/63 |

FOREIGN PATENT DOCUMENTS

| | | | |
|---|---|---|---|
| 6502273 | 8/1966 | Netherlands | 17/63 |

*Primary Examiner*—Willis Little

*Attorney, Agent, or Firm*—Hill, Van Santen, Steadman & Simpson

[57] ABSTRACT

A meat cutting machine which comprises a cutting table formed with an endless belt formed of meat supporting flights upon which meat can be placed so that it passes a cutter who cuts the meat and wherein the machine includes a discharge paddle and driving mechanism which ejects the meat at the end of its travel on the table after it has been cut and which is automatically actuated by a sensing means.

10 Claims, 4 Drawing Sheets

FIG. 5
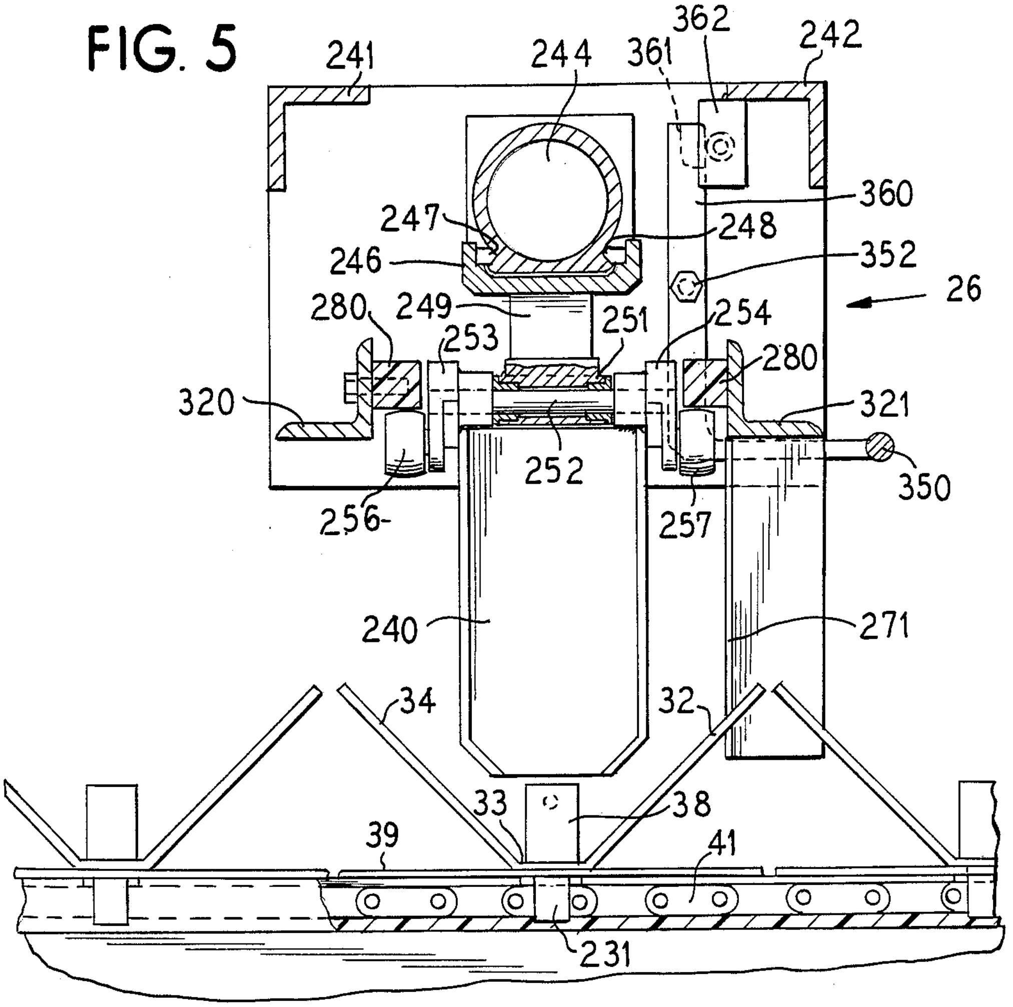
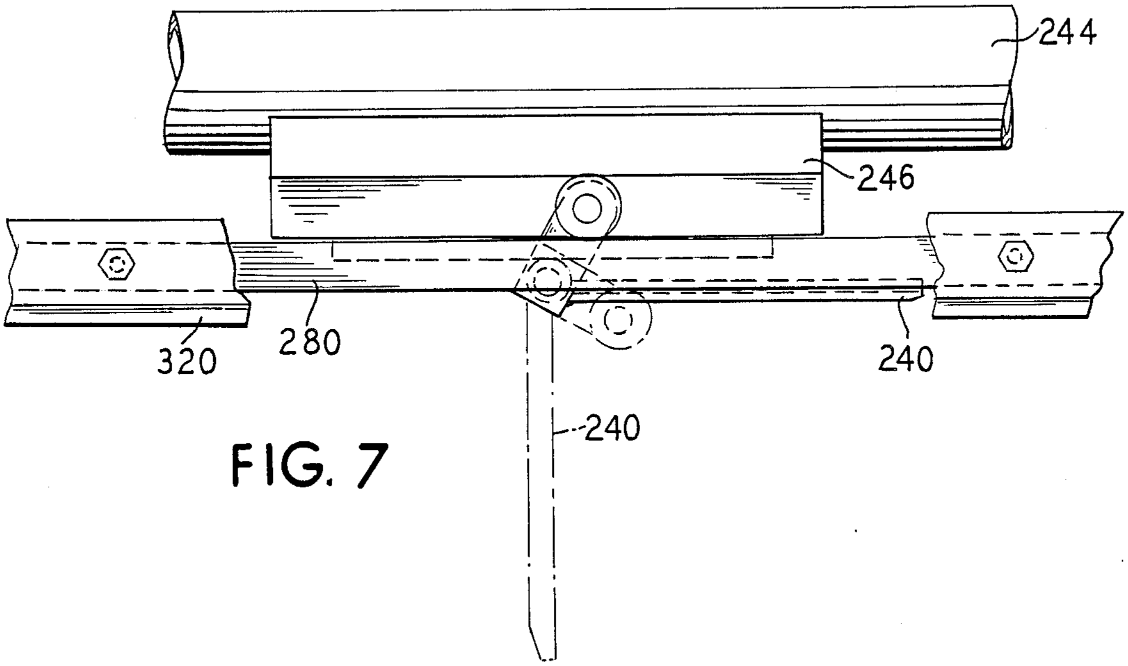
FIG. 7

MEAT CUTTING MACHINE

BACKGROUND OF THE INVENTION

1. Field of the Invention

This invention relates in general to meat cutting machines and in particular to a novel meat cutting machine which has an endless belt that carries a number of meat holding flights to move the meat past a cutter who cuts the meat and then it is ejected from the machine.

2. Description of the Prior Art

U.S. Pat. Nos. 3,748,146 and 3,593,369 relate to meat handling machines, but they do not provide a meat moving machine which has a tilted work area and which has an automatic discharge mechanism for the meat after it has been processed.

SUMMARY OF THE INVENTION

This invention relates to a meat cutting machine which includes a frame upon which is mounted an endless belt comprising a number of meat holding flights upon which meat can be placed so as to move by a cutter. The cutter cuts the meat as it passes along the machine and an ejector mechanism comprising a transversely moving paddle engages the meat and ejects it from the meat holding flights onto a second surface. The ejector mechanism is automatically controlled by a sensing mechanism. The machine has removeable panels which allow rapid and thorough cleaning of the machine.

The machine allows a substantial increase in the amount of meat that can be cut by a single operator.

Other objects, features and advantages of the invention will become apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 5 is a detailed view illustrating the paddle ejector mechanism;

FIG. 7 illustrates the paddle ejector mechanism.

DESCRIPTION OF THE PREFERRED EMBODIMENTS

Figure 1:
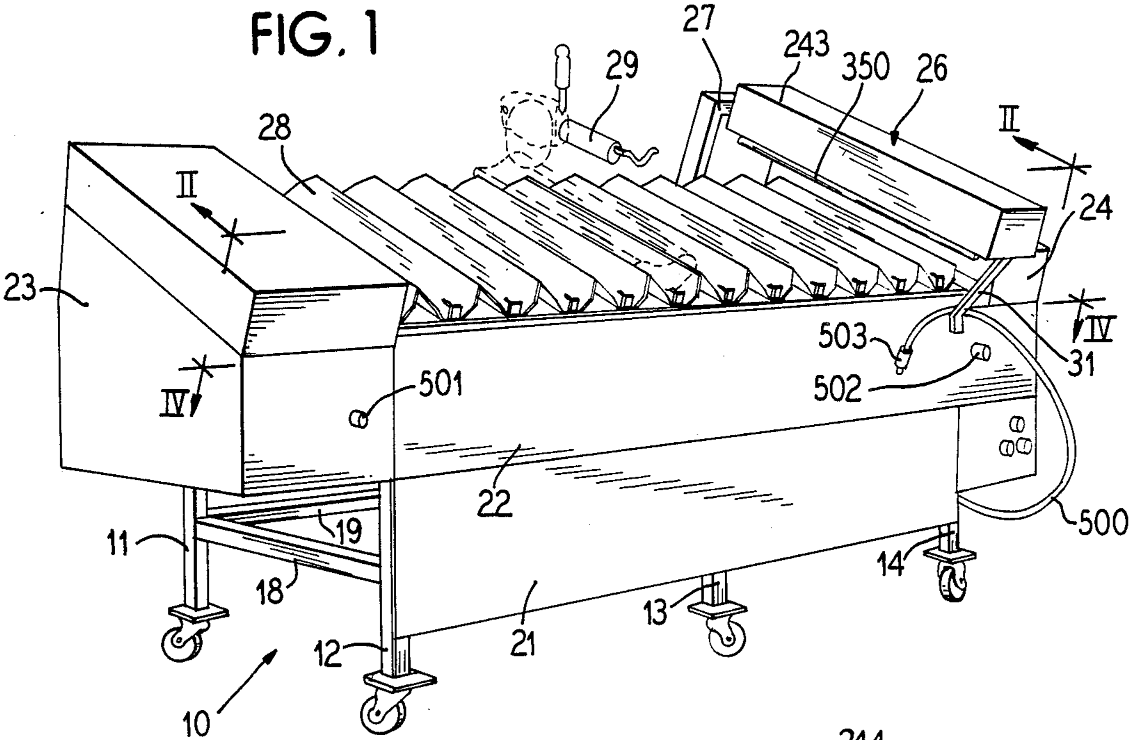
FIG. 1 is a perspective view of the meat cutting machine of the invention.
Figure 3:
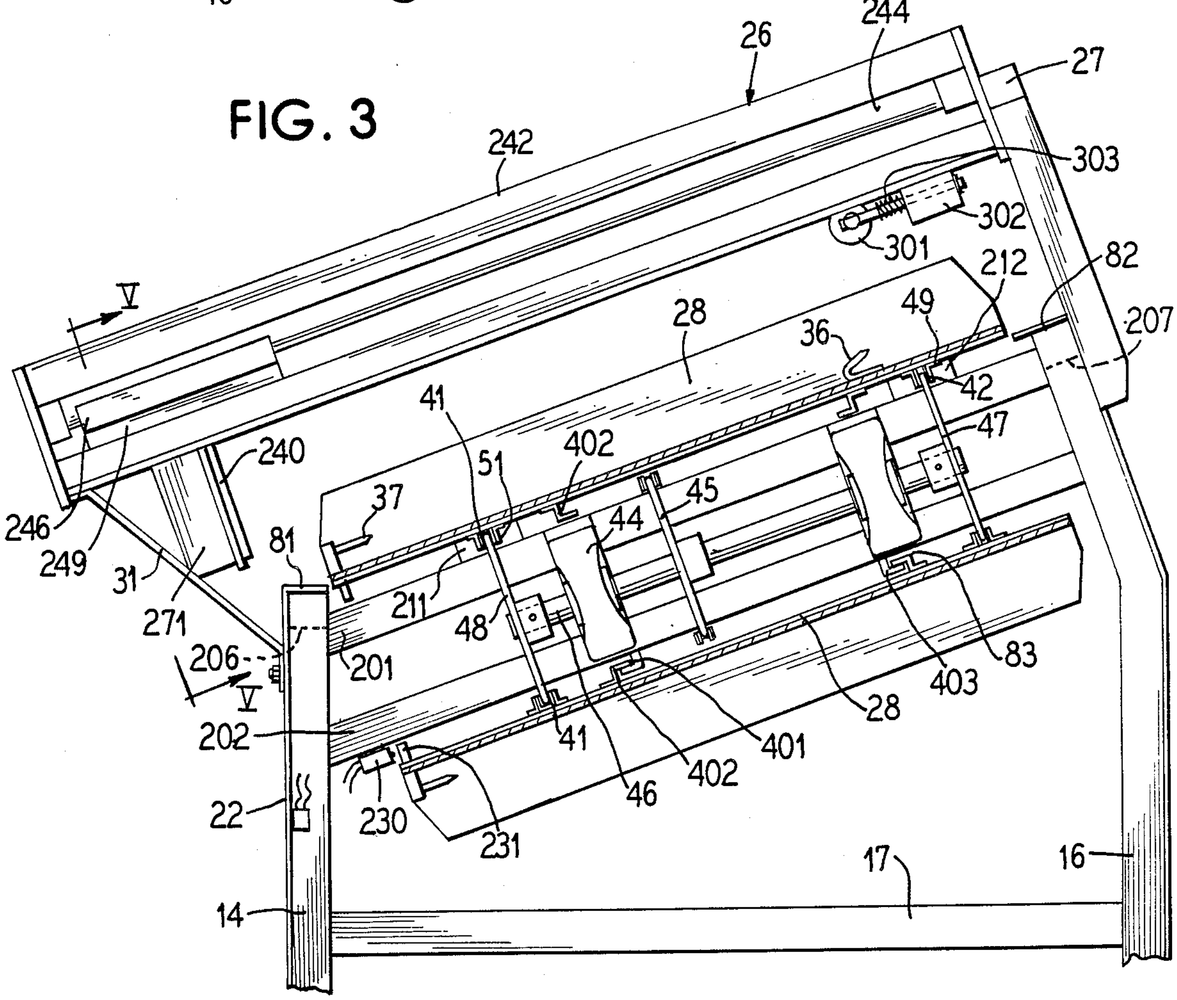
FIG. 3 is an end view of the machine.

FIG. 1 shows the meat cutting machine 10 of the invention which has downwardly extending legs 11, 12, 13 and 14 which are connected by horizontal frame members 17, 18 and 19 as illustrated in FIGS. 1 and 3. A plurality of meat holding flights 28 are mounted on the frame of the machine by means including a pair of endless chains 41 and 42. A cover member 23 is mounted on the left end relative to FIG. 1 of the meat cutting machine and a cover member 24 is mounted on the right end relative to FIG. 1 of the meat cutting machine. A meat ejector 26 is supported by frame members 27 and 31 and includes a cover member 243 as illustrated in FIG. 1. A turnoff lever 350 is mounted below the cover member 243 of the meat ejector 26 as shown in FIG. 1. The front panel cover members 21 and 22 cover the front of the machine as illustrated in FIG. 1.

Safety cutoffs switches 501, 502 are mounted on the front panel 22 and a safety cutoof switch 503 is mounted on a flexible cable 500 where it can be actuated by the operator.

Figure 2:
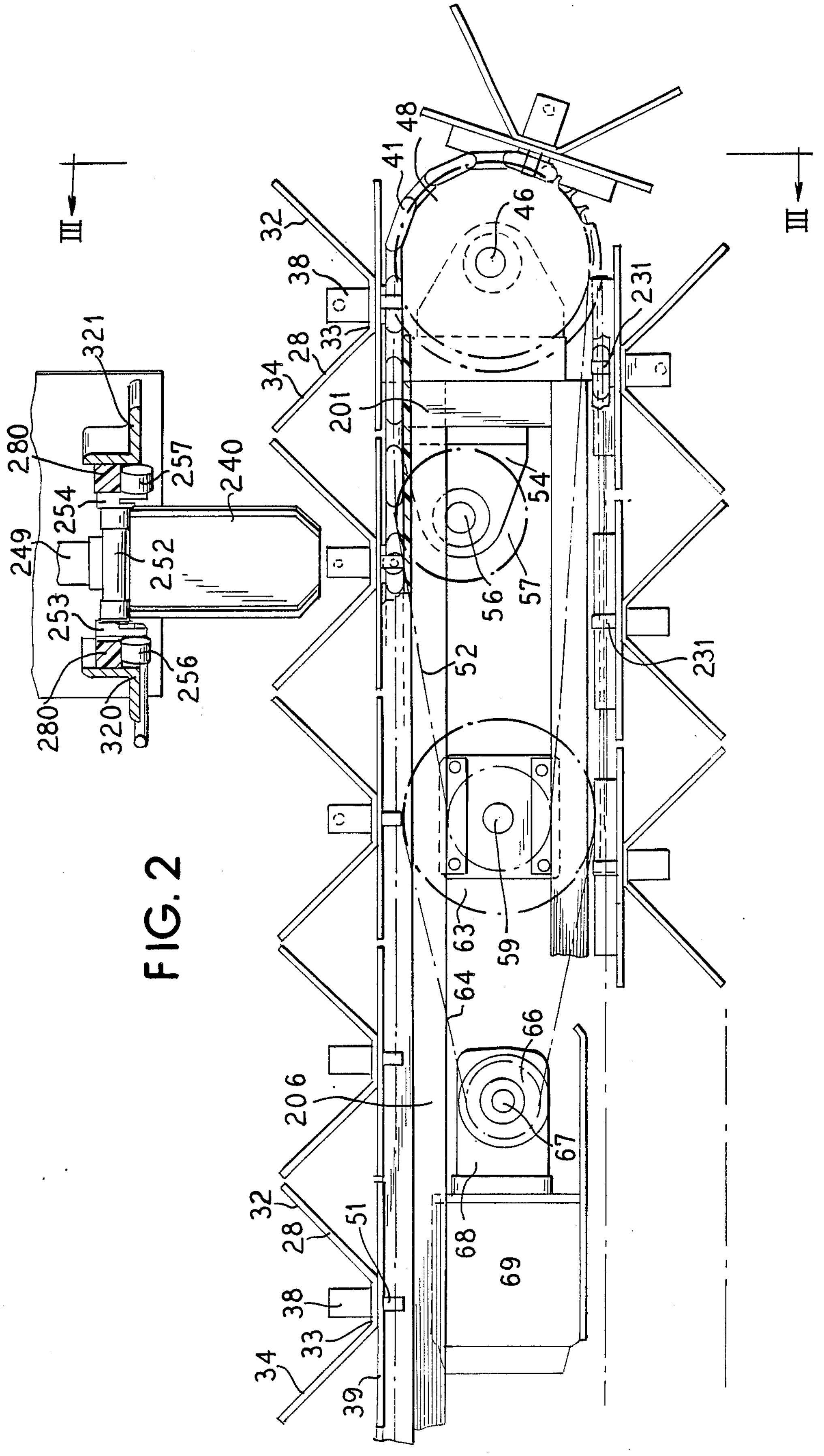
FIG. 2 is a side partially cutaway plan view of the invention.
Figure 4:
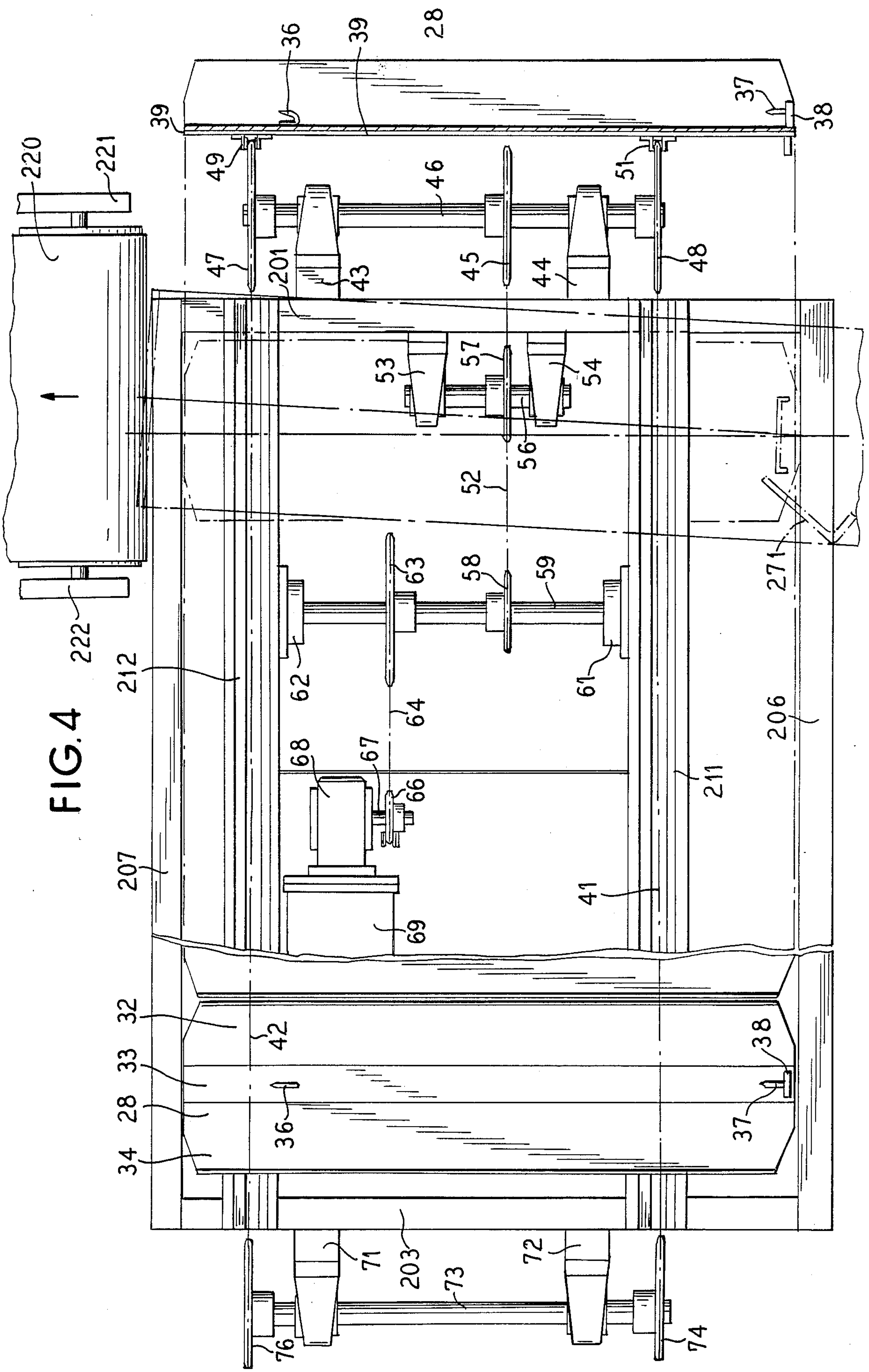
FIG. 4 is a top plan view of the machine partially cutaway.

The flights 28 are tilted with about a 20° slope toward the front of the machine as illustrated in FIG. 1 and the operator stands on the low side of the flights and cuts the meat with a suitable saw such as the saw 29 as the meat passes from the left to the right relative to FIG. 1. The ejector mechanism 26 has a ejector paddle 240 as shown in FIGS. 2 and 3, for example, which engages the meat and moves it transversely of the machine to a moving receiving belt 220 as illustrated in FIG. 4 which removes the cut meat from the machine. The belt 220 is supported on frame members 221 and 222 as shown in FIG. 4.

The flights 28 are shown in end view in FIG. 2 and comprise a pair of plates 32 and 34 which are connected by a flat longitudinal member 33. The plates 32 and 34 make approximately a 90° angle relative to each other. A flat backing plate 39 is connected to the flat portion 33 of the flight as shown in FIG. 2, for example. At the front end of the flights relative to FIG. 1, a bracket 38 holds a meat engaging spike 37 and adjacent the end opposite the end where the bracket 38 is mounted a meat holding spike 36 is attached to the member 33 as illustrated in FIG. 4. The flights 28 are attached to the two endless chains 41 and 42 by brackets 51 and 49 which form part of the chains 41 and 42 and which are connected to the bottom surface of the flat plate 39 of the flights as illustrated, for example, in FIG. 3. The chains 41 and 42 ride in longitudinal guides 211 and 212 as shown in FIGS. 3 and 4 which may be made of nylon or other suitable low friction material.

The chain 42 runs over a driving gear 47 and an idler gear 76 as shown, for example, in FIG. 4. The driving gear 47 is mounted on a shaft 46 which is supported in bearing members 43 and 44 which are connected to the frame of the machine. A gear 45 is non-rotatably mounted on the shaft 46 and is driven by a chain 52 which passes over an idler gear 57 mounted on a shaft 56 supported by frame members 53 and 54 and passes over a gear 58 mounted on a shaft 59. The gear 57 prevents the chain 52 from hitting a portion of the frame. The shaft 59 upon which the gear 58 is mounted is rotatably supported in bearing members 61, 62 which are connected to the frame and shaft **5*a* carries a driving gear 63 which is connected by a chain 64 to a gear 66 mounted on shaft 67 of a reducer mechanism 68 which is driven by a motor 69** mounted on the frame of the machine.

Thus, when the motor 69 is actuated, the driving gears 47 and 48 are driven through the various gears and chain arrangement. The chain 41 is driven by the gear 48 mounted on shaft 46 and passes over the idler gear 74 carried by shaft 73 at the other end of the machine. Gear 76 is mounted on shaft 73.

As shown in FIG. 3, lower guide member 401 and 402 are connected to a transverse frame member 202 and engage guide members 83 and 402 which are connected to the back of the flights 28 so as to hold them in the proper position for the return of the flights between shaft 73 and shaft 46. Transverse frame member 201 holds the guides 211 and 212 as illustrated in FIG. 3. At the backside of each of the flights, a projection 231 extends which can be sensed by a sensor 230 as illustrated in FIG. 3 so as to time the ejector mechanism 26 such that it is synchronized with movement of the flights 28 to prevent the ejector paddle 240 from engaging the sidewalls 32 and 34 of the flights.

The ejector mechanism 26 is angled as shown in FIG. 4 relative to the flights so that as the flights move to the right relative to FIG. 4, the ejector paddle will not engage the side walls 32 and 34 of the flights. The ejector mechanism is supported by the frame members 27 and 31 which support the angle iron members 241 and 242 illustrated in FIG. 5 and a cover member 243 can be mounted over the ejector mechanism. The ejector mechansim includes a rodless air cylinder 244 which is a commercially available item which actuates a trolley 246 connected to the rodless cylinder 244 by pins 247 and 248 which ride in suitable grooves as shown in FIG. 5. A downwardly extending support 249 carries a collar 251 as illustrated in FIG. 5 through which a shaft 252 extends. The ejector paddle 240 is connected to a pair of collar members 253 and 254 which are rotatably supported on opposite ends of the shaft 252. The collar members 253 and 254 rotatably support track following rollers 256 and 257 on opposite sides of the paddle 240 and the rotational angle of the rollers 256 and 257 is offset from the center axis of the shaft 252. The rollers 256 and 257 engage tracks 280 and 280° which are supported by members 320 and 321 from the frame of the machine.

Figure 6:
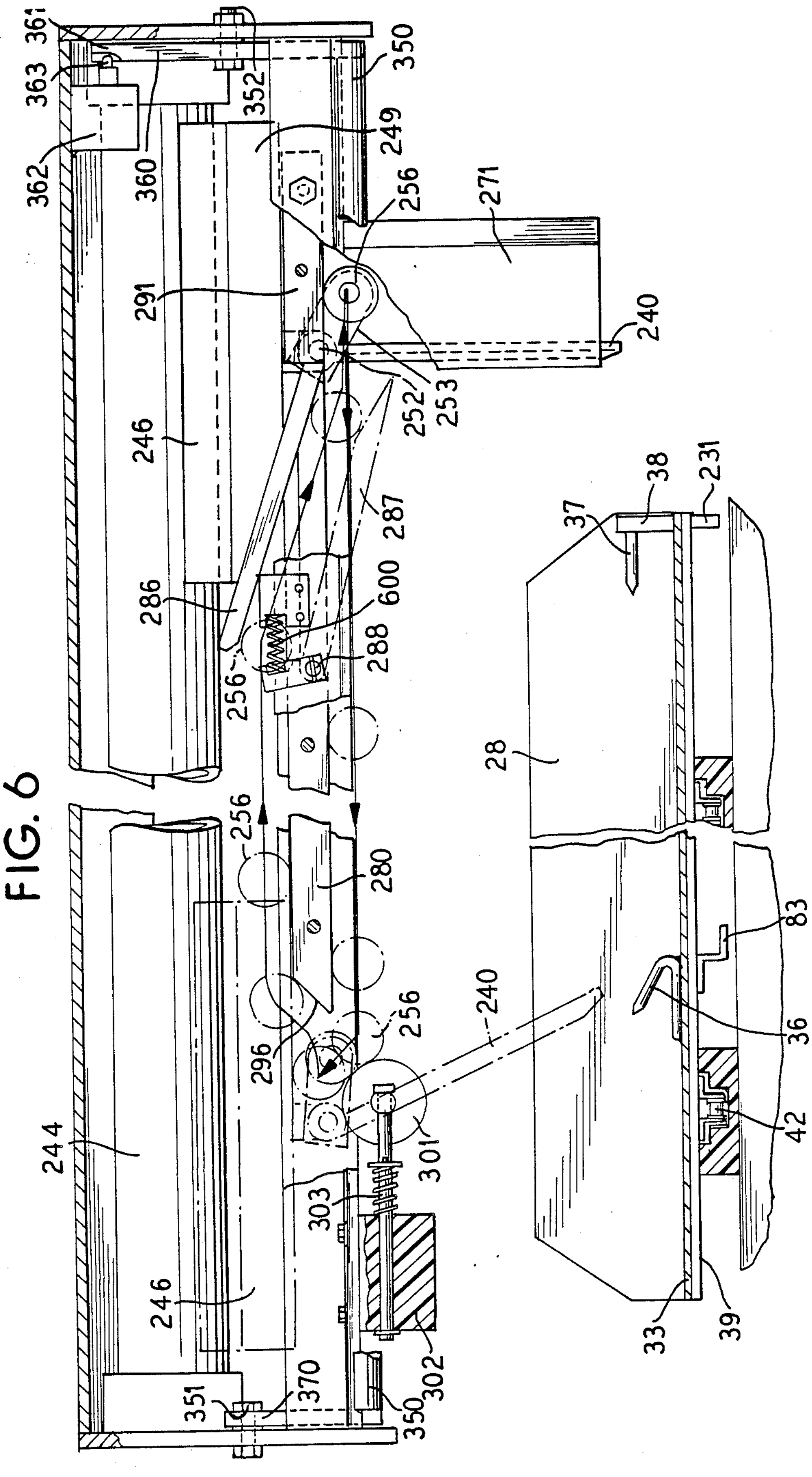
FIG. 6 illustrates the control mechanism for the paddle ejector mechanism.

In operation, the ejector paddle 240 is moved by the rodless cylinder 244 so that it pushes the meat from the machine 10 onto the belt 220 illustrated in FIG. 4. Thus, when the paddle is ejecting meat from the machine, it is in the down position as illustrated in FIG. 2, 3 and 5. After it has ejected the meat, the paddle 240 is moved to an up position with the mechanism of the machine so that as the rodless cylinder 244 returns it to the front of the machine relative to FIG. 1, the paddle does not engage the flights 28 or meat which is supported on the flights. This is accomplished with a mechanism illustrated in FIGS. 2, 3 and 5 through 7. Relative to FIG. 6, the rollers 256 and 257 ride on the undersurface of the associate tracks 280 and 280′ during the meat ejecting cycle which holds the paddle 240 in the down position substantially vertical which position is illustrated for example in FIGS. 2 and 3. When the rodless cylinder 244 moves the paddle 240 to the upper or left end relative to FIG. 6 which completes the ejection cycle, the roller 256 can ride up the end 296 of the track 280 so that the paddle 240 will pivot to the horizontal position. A pair of rollers such as the roller 301 engages the roller 256 to deflect the roller 256 upwardly as illustrated in FIG. 6. The roller 301 is mounted on a spring bias shaft 303 which is mounted in a member 302 connected to the frame of the machine. As the roller 256 is pivoted upwardly by the roller 301, the paddle 240 will rotate about shaft 252 to the up position. Since the end 296 of the track 280 is tapered, as the rodless cylinder 244 moves the trolley 246 to the right relative to FIG. 6, the roller 256 will ride on the upper surface of the track 280, thus holding the paddle 240 in the substantially horizontal position. The paddle stays in the up position during the return travel until the roller 256 reaches a pivoted track portion 287 which is supported by a pivot 288 at the end of track 280 and which is spring biased in the up position by spring 600. A deflector member 286 is connected to the frame of the machine and as the trolley 246 moves to the right, the roller 256 engages the deflector member 286 which causes the roller 256 to move downwardly thus pivoting the paddle downwardly to the vertical position. The trolley 246 moves the roller 256 beyond the end of the pivoted track 286 until it engages a fixed track 291 mounted on the frame of the machine and which is aligned with the track 280. After the roller 256 has passed beyond the end of the pivoted track 287, the track 287 pivots to the up position and the ejector mechanism is ready for the next ejection cycle. When the rodless cylinder 244 is again energized so as to eject meat from the flight, the roller 256 moves to the end of track 291 and on the lower surface of pivoted track 287 and down track 280 to repeat the cycle. It is to be realized that the roller 257 follows a mechanism which is similar to that described for roller 256 during actuation.

The projections 231 on the backside of the flight which are illustrated, for example, in FIGS. 2 and 3 are sensed by the sensor 230 which is properly timed to energize the ejector mechanism so that the paddle 240 never engages the sidewalls of the flights 28 and properly ejects the meat from the machine.

A turnoff rod 350 extends along the ejector mechanism 26 such that if it is engaged by the meat, it will turn off the machine. The safety rod 350 is connected to arms 360 and 370 which are pivoted on pivot pins 351 and 352 as illustrated in FIG. 6. The upper end 361 of the arm 360 is engageable with a switch contact 363 of a switch 362 so that when the turnoff bar 350 is pivoted about the pivot pins 351 and 352, the switch 352 is closed to turn off the machine.

Deflector plates 271 illustrated in FIGS. 3 and 5 are mounted to the frame to assure that the meat does not become improperly positioned on the flights 28.

It is seen that this invention provides an improved meat cutting machine and although it has been described with respect to preferred embodiments, it is not to be so limited as changes and modifications can be made therein which are within the full intended scope as defined by the appended claims.

We claim as our invention:

1. A meat cutting machine comprising, a frame, a pair of parallel mounted endless chains supported on said frame, at least one driving gear rotatably mounted on said frame and in mesh with one of said chains to drive it, a driving means mounted on said frame and connected to drive said driving gear, a plurality of meat holding flights attached to said endless chains and each formed with a meat holding trough into which meat can be inserted, one of said pair of endless chains mounted so that it is higher than the other one of said pair of endless chains so that the longitudinal axis of said plurality of meat holding flights are inclined, and a meat ejecting means mounted on said frame and operable to engage meat on said flights to discharge it from the high ends of said plurality of flights.

2. A meat cutting machine according to claim 1 wherein each of said meat holding flights is formed with a back plate which is attached to said pair of endless chains and a pair of inclined plates attached to said back plate and said pair of inclined plates have about a ninety degree angle between them.

3. A meat cutting machine according to claim 2 including at least one meat holding hook mounted on each of said plurality of meat holding flights.

4. A meat cutting machine according to claim 3 wherein said one meat holding hook is mounted to each of said plurality of meat holding flights near the lower end of said flights.

5. A meat cutting machine according to claim 4 wherein a second meat holding hook is mounted to each of said plurality of meat holding flights between the lower and upper ends thereof.

6. A meat cutting machine according to claim 2 wherein said meat ejecting means includes an air cylinder mounted on said frame, a trolley mounted so that it is driven by said air cylinder, and a pivoted paddle connected to said trolley and driven so as to engage meat in said plurality of flights and eject it from the high ends of said flights.

7. A meat cutting machine according to claim 6 including means for locking said paddle in the down position as said paddle moves upwardly through each of said plurality of flights and means to retract said paddle to the horizontal position as it returns to the low ends of said plurality of flights.

8. A meat cutting machine according to claim 7 wherein said means for locking said paddle in the down position includes a roller attached to said paddle and a rail engageable with said roller.

9. A meat cutting machine according to claim 8 wherein said means to retract said paddle operates by allowing said roller to move from the bottom of said rail to the top of said rail.

10. A meat cutting machine according to claim 9 including a pivoted rail section mounted on said frame to allow said roller to move from the top to the bottom of said rail.

* * * * *